3,497,536
PREPARATION OF STEAROYL CHLORIDE
Edward S. Rothman and Samuel Serota, Philadelphia, Pa., assignors to the United States of America as represented by the Secretary of Agriculture
No Drawing. Filed Jan. 25, 1968, Ser. No. 700,354
Int. Cl. C11c 3/00; C07c 51/58
U.S. Cl. 260—408                                       5 Claims

ABSTRACT OF THE DISCLOSURE

Stearoyl chloride of high purity is prepared by passing dry hydrogen chloride through isopropenyl stearate. The isopropenyl stearate can be in solution in which case no heat is required or it can be in the molten state.

---

A non-exclusive, irrevocable, royalty-free license in the invention herein described, throughout the world for all purposes of the United States Government, with the power to grant sublicenses for such purposes is hereby granted to the Government of the United States of America.

This invention relates to the preparation of stearoyl chloride and more particularly to a simple, direct process for preparing this compound by the reaction of isopropenyl stearate and dry hydrogen chloride.

The importance of acid chlorides in preparative work is well known to chemists. Stearoyl chloride has many uses, among them the preparation of substituted imides, amides and acid anhydrides, the esterification of alcohols and the synthesis of organic compounds.

The object of this invention is to provide a novel process for preparing stearoyl chloride of high purity.

According to this invention dry hydrogen chloride is reacted with isopropenyl stearate in solution or in the molten state to form high purity stearoyl chloride. The acid chloride is formed directly and quantitatively by the displacement of acetone from the isopropenyl stearate.

This invention is a decided improvement over present methods of making acid chlorides. For example, stearoyl chloride prepared by standard methods such as the treatment of an appropriate acid with phosphorus pentachloride is contaminated by phosphorous acid derivatives. In addition, distillation is often destructive to the high molecular weight acid chlorides, giving poor recoveries since polymeric hexadecylketene products and hydrogen chloride are formed.

The present invention is illustrated by the following examples.

Example 1

A stream of dry hydrogen chloride gas was bubbled through isopropenyl stearate dissolved in dry diethyl ether. The reaction was conducted at ambient room temperatures (20–30° C.). After three hours, the bubbling of hydrogen chloride gas was stopped and the reaction mixture allowed to stand overnight. The ethereal hydrogen chloride was then removed and pure stearoyl chloride was obtained. The product was colorless and was not contaminated with stearic acid or unreacted isopropenyl stearate.

Example 2

A stream of dry hydrogen chloride was passed through isopropenyl stearate which was made molten by raising the temperature to 145° C. After 30 minutes, the reaction was shown by infrared analysis to be 50% complete. The only constituents of the mixture at this time were stearoyl chloride and unreacted isopropenyl stearate. After one hour the reaction reached completion as evidenced by the presence of only a single carbonyl band at 5.53 microns. The product, stearoyl chloride, was practically colorless.

We claim:
1. A process for making stearoyl chloride comprising reacting isopropenyl stearate with anhydrous hydrogen chloride.
2. The process of claim 1 in which the anhydrous hydrogen chloride is bubbled through a diethyl ether solution of the isopropenyl stearate for about three hours, the reaction mixture then allowed to stand for about 16 hours and the product obtained by removing ethereal hydrogen chloride.
3. The process of claim 2 in which the reaction is conducted at ambient room temperatures between 20 and 30° C.
4. The process of claim 1 in which the anhydrous hydrogen chloride is passed through molten isopropenyl stearate for about one hour.
5. The process of claim 4 in which the reaction is conducted at about 145° C.

References Cited

Fedulov, "Preparation of the Acid Chlorides of Organic Acids," Chem. Abs., vol. 63 (1965) 1707f.

Oda et al., "Aliphatic Acid Chlorides," Chem. Abs., vol. 61 (1964) 2786g.

Bauer et al., "Preparation of Fat Acid Chlorides," Chem. Abs., vol. 40 (1946) 1330$^2$.

LEWIS GOTTS, Primary Examiner

CATHERINE L. MILLS, Assistant Examiner

U.S. Cl. X.R.

260—544